(12) United States Patent
Kota

(10) Patent No.: US 6,491,262 B1
(45) Date of Patent: Dec. 10, 2002

(54) SYSTEM FOR VARYING A SURFACE CONTOUR

(76) Inventor: Sridhar Kota, 9391 Quail Ridge Run, Brighton, MI (US) 48114

( * ) Notice: Subject to any disclaimer, the term of this patent is extended or adjusted under 35 U.S.C. 154(b) by 0 days.

(21) Appl. No.: 09/600,822

(22) PCT Filed: Jan. 15, 1999

(86) PCT No.: PCT/US99/00901
§ 371 (c)(1),
(2), (4) Date: Sep. 21, 2000

(87) PCT Pub. No.: WO99/36313
PCT Pub. Date: Jul. 22, 1999

(51) Int. Cl.$^7$ ................................................. B64C 3/44
(52) U.S. Cl. ..................................... 244/219; 244/75 R
(58) Field of Search .............................. 244/75 R, 216, 244/213, 214, 215, 131; 901/21, 36, 37; 74/108, 470; 16/225

(56) References Cited

U.S. PATENT DOCUMENTS

| | | | | |
|---|---|---|---|---|
| 1,856,578 A | * | 5/1932 | Miquel et al. | 244/219 |
| 3,118,639 A | * | 1/1964 | Kiceniuk | 244/219 |
| 4,349,169 A | * | 9/1982 | McAnally | 244/219 |
| 4,351,502 A | * | 9/1982 | Statkus | 244/219 |
| 4,865,275 A | * | 9/1989 | Thompson | 244/219 |
| 5,033,693 A | * | 7/1991 | Livingston et al. | 244/219 |
| 5,150,864 A | * | 9/1992 | Roglin et al. | 244/219 |
| 5,367,970 A | * | 11/1994 | Beauchamp | 244/219 |
| 5,810,291 A | * | 9/1998 | Geiger et al. | 244/219 |
| 6,173,925 B1 | * | 1/2001 | Mueller et al. | 244/219 |

FOREIGN PATENT DOCUMENTS

| | | | | |
|---|---|---|---|---|
| FR | 770113 | * | 9/1934 | 244/219 |
| FR | 2374208 | * | 8/1978 | 244/219 |
| GB | 18604 | * | 3/1911 | 244/219 |

* cited by examiner

*Primary Examiner*—Galen L. Barefoot
(74) *Attorney, Agent, or Firm*—Rohm & Monsanto, PLC (57) ABSTRACT

Compliant mechanisms are arranged to enable airfoil and other structures to adapt their shapes to different flight conditions and thereby achieve optimum lift:drag ratios in plural flight conditions. The compliant mechanisms can be formed integrally whereby a compliant frame thereof, or the skin of the airfoil, undergo elastic or other deformation to produce the desired displacements in direct response to applied forces. In an airfoil context, shape changes can be effected by the leading and trailing edges of the entire airfoil system. In addition, the driver arrangements of the compliant mechanisms can be controlled individually to effect a desired surface contour throughout the length of the wing, illustratively a twist therein.

15 Claims, 5 Drawing Sheets

SYSTEM FOR VARYING A SURFACE CONTOUR

This is a 371 of PCT/US99/00901 filed Jan. 15, 1999 which claims benefit of Ser. No 09/007,309, now U.S. Pat. No. 5,971,328.

BACKGROUND OF THE INVENTION

1. Field of the Invention

This invention relates generally to systems for producing adjustable surface contours, such as for control surfaces for aircraft, and more particularly, to a system that produces a variable surface contour of a compliant, continuous surface.

2. Description of the Related Art

A need for surfaces having an adjustable or variable contour is present in a wide variety of applications, ranging from aircraft control surfaces to specialized furniture. Absent the ability to vary the surface contour in any, such application results in the creation of products and systems that are not optimally designed, but instead are configured as compromises between conflicting design goals. In the case of airfoils for aircraft, it is known that overall drag results from the combination of friction between the airfoil and the air flowing therearound, and the lift component of force supplied to an aircraft wing. In such an application, innumerable variations can be effected between airfoil thickness, airfoil camber, airfoil length and width, and the like. The conventional airfoil, therefore, is but the implementation of an engineering compromise to effect an acceptable lift:drag ratio, which is a primary flight control parameter. There is a need, therefore, for an arrangement that enables advantageous variation in the shape of an airfoil and the contour of the associated control surfaces.

There is a need for an arrangement for varying the dimensions and contours of airfoils, such as aircraft wings, so as to optimize same for different flight conditions Thus, for example, the wing configuration that would be optimum for stable, undisturbed flight, would be different from the wing configuration that would be optimized during take-off and landing: It would additionally be advantageous if the contour of the airfoil is adjusted in a manner that is not constant throughout the length of the airfoil, but which varies, illustratively to form a twist along the control surface of the wing. There is a need for optimizing the configuration and contour of such surfaces in other applications, such as in hydrofoils for water craft and spoilers for high speed land vehicles.

In addition to the foregoing, there is a need for a system that affords advantageous variation of a surface contour for applications unrelated to airfoils, hydrofoils, spoilers,.and the like. Such other applications may include, for example, adjustable seating surfaces, including back supports as well as fluid passageways, the dimensions of which are desired to be varied, such as an air intake passageway for an engine of a vehicle.

It is, therefore, an object of this invention to provide a simple and economical arrangement for varying a contour of a surface.

It is also an object of this invention to provide an airfoil having an adjustable configuration.

SUMMARY OF THE INVENTION

The foregoing and other objects are achieved by this invention which provides in a first apparatus aspect thereof an arrangement for producing a variable contour of a compliant surface. In accordance with the invention there is provided a compliant frame member having a predetermined contour arranged to communicate with the compliant surface. An actuator element is arranged in predetermined first relation with respect to the compliant frame member, and there is further provided at least one linkage member coupled at a first end thereof to the compliant frame member, and at a second end thereof to the actuator element. With this arrangement, displacement of the actuator element results in a corresponding displacement of the contour of the compliant frame member. The linkage element has a predetermined resilience characteristic.

In one embodiment, the predetermined resilience characteristic of said linkage element has a directional aspect. Such a directional aspect of the predetermined resilience characteristic can correspond to a resilient compression characteristic, and in other embodiments, to a resilient lateral deflection characteristic. A resilient lateral deflection characteristic would correspond to a resilient lateral beam load response.

In an advantageous embodiment of the invention, the compliant frame member, the actuator element, and the linkage element are integrally formed. In a further embodiment, the displacement of the actuator element is transmitted via the linkage element to produce a substantially orthogonal displacement of the compliant frame member. Thus, the displacement of the actuator element and the corresponding displacement of the compliant frame member are not necessarily in the same plane.

In a farther embodiment there is provided a plurality of further linkage elements, each coupled at a respective first end thereof to the compliant frame member at a predetermined location thereof The plurality of further linkage elements are each coupled at a second end thereof to the actuator element. Displacement of the actuator element results in a corresponding displacement of a contour of the compliant frame member. In embodiments where the actuator element has a determined configuration, the plurality of further linkage elements are each coupled at respective second ends thereof at predetermined locations of the actuator element. The actuator element may be displaced angularly to achieve a desired displacement of the compliant frame member and thereby achieve a predetermined corresponding displacement of the contour of the compliant frame member. Such angular displacement may be in the form of rotation in a direction parallel to the plane of the compliant frame member, or about an axis substantially parallel to that plane, whereby the actuator element is rotatable in a direction transverse to the plane of the compliant frame element.

In a further embodiment of the invention, there is provided a second actuator element coupled to the actuator element. An additional linkage element is coupled at a first end thereof to the compliant frame member at a predetermined location thereof, and at a second end thereof to the second actuator elements. In this manner, displacement of the second actuator element, in response to displacement of the actuator element, results in a determinable displacement of the contour of the compliant frame member, and consequently, achieves a desired change in the contour of the compliant surface. In one embodiment of the invention, a plurality of further linkage elements are each coupled at a respective first end thereof to the compliant frame member at a predetermined location thereof, and at a second end thereof to the actuator element. The linkage element and the further linkage elements have a determined compliance characteristic that enables transmission there along of a load to the compliant frame, whereby a rotatory displacement of the actuator element results in a corresponding displacement of the contour of the compliant frame member. In a further embodiment, the actuator element is displaced radially, and such radial displacement causes to be transmitted along the various linkage elements, in a manner that corresponds to their respective compliance characteristics, a load that is delivered to the compliant frame member.

As previously stated, the compliant surface, the contour of which advantageously is varied in accordance with the invention herein, is the surface of an airfoil. In such an embodiment, the airfoil is adjusted in its configuration to achieve optimization for a particular flight condition. However, the present invention provides advantages in airfoils that are not directly related to flight, such as effecting an effective deicing procedure of the surface of an airfoil. The advantageously adjustable surface contour of the present invention can be applied to the surface of a rotor blade of a rotary wing aircraft, or the surface of a hydrofoil. Also, the compliance surface can be arranged in an air inlet of an engine or other fluid passageway to effect desired fluid flow characteristics.

In accordance with a further apparatus aspect of the invention, there is provided an airfoil of a type having a substantially longitudinal axis arranged transverse to a direction of travel of the airfoil through a fluid medium. The airfoil is provided with a deformable control surface that extends along a substantially longitudinal axis of the airfoil. A plurality of compliant deformation arrangements are disposed sequentially along the substantially longitudinal axis of the airfoil, each of the plurality of compliant deformation arrangements having a respectively associated input for receiving an input force, and being arranged to communicate with the deformable control surface for deforming same in response to the input force that is applied to each of the plurality of compliant deformation arrangements. There is additionally provided a plurality of force transmission elements, each associated with a respective one of the inputs of the plurality of compliant deformation arrangements. The force transmission elements apply the input force to the respectively associated one of the plurality of compliant deformation arrangements for displacing same correspondingly. In this manner, the deformable control surface is responsively deformed.

In one embodiment, the force transmission elements have a directional predetermined resilience characteristic. Such a directional predetermined resilience characteristic can correspond to a resilient compression characteristic, and in other embodiments, to a resilient lateral deflection characteristic. A resilient lateral deflection characteristic would correspond to a resilient lateral beam load response, as previously noted.

In one embodiment of this further aspect of the invention, the plurality of force transmission elements are each coupled to a drive system. The drive system may include a drive shaft that extends substantially parallel to the substantially longitudinal axis of the airfoil. The force transmission elements are each engaged with the drive shaft, each such engagement being characterized by a respectively associated mechanical advantage characteristic that determines a corresponding extend of deformation of the deformable control surface. For example, the mechanical advantage characteristic may be determined by a screw thread pitch and the direction of rotation.

Further in accordance with this further aspect of the invention, there is additionally provided a plurality of second compliant deformation arrangements, each having a respectively associated input for receiving a respective input force and arranged to communicate with the deformable control surface for deforming same in response to the respective input force applied to each of the plurality of second compliant deformation arrangements.

In one highly advantageous embodiment of this further aspect of the invention, there is provided a drive controller associated with the drive system for controlling the operation thereof in accordance with a selected drive scheme for producing a predeterminable deformation contour of the deformable control surface along the substantially longitudinal axis of the airfoil. In one embodiment, the predeterminable deformation contour of the deformable control surface is selected in response to an operating condition of the airfoil. Such an operating condition, in the context of a wing of an aircraft, may include a normal flight condition, a landing condition, a takeoff condition, or any other condition wherein a predetermined primary flight control characteristic is desired, such as a tailored lift-draft ratio. In addition, there is additionally provided a memory arrangement for storing data responsive to a plurality of selectable drive schemes for achieving a plurality of predeterminable deformation contours of the deformation control surface corresponding to the respective operating conditions of the airfoil. It may be desirable in some embodiments of the invention to effect an overall predeterminable deformation contour for a wing of an aircraft that corresponds to a twist thereof along the length of the airfoil. In achieving such a twist condition, the various sequential compliant deformation arrangements are driven in characteristically different drive conditions to effect the wing twist.

In accordance with a still further apparatus aspect of the invention, there is provided an arrangement for varying a surface contour in response to displacement of an actuator element. In accordance with this aspect of the invention, there is provided a compliant surface having a predetermined surface contour on a first side thereof A compliant frame member having a first predetermined contour characteristic and arranged to communicate with a second side of the compliant surface is provided, whereby an aspect of the first predetermined contour characteristic is imparted to the compliant surface. A linkage element is arranged to be coupled at a first end thereof to the compliant frame member and at a second end thereof to the actuator element. In this manner, displacement of the actuator element results in a corresponding variation in the contour of the compliant frame member. Additionally, there is provided a drive arrangement for displacing the actuator element with respect to the compliant frame member.

In one embodiment of the invention, the compliant frame member, the actuator element, and the linkage element are integrally formed with one another. Such integral formation may be of a compliant polymeric material.

The linkage element has a predetermined compliance characteristic, and in some embodiments, may be substantially rigid. The dimensions, curvature, and compliance characteristic of the linkage elements determine the extent and manner of transmission of forces from the actuator element are delivered to the compliant frame member.

In this further apparatus aspect of the invention, there is provided a drive coupling arrangement, as previously noted, for coupling the drive arrangement to the actuator element in accordance with a predetermined drive characteristic. In some embodiments, the drive characteristic corresponds to a predetermined thread pitch and direction of drive motion. In other embodiments, the drive characteristic may be in accordance with a predetermined cam characteristic. Thus, the actuator element may be moved linearly transverse to the plane of the compliant frame member or angularly with respect thereto. The motion of the driver arrangement can result in rotatory or radial motion of the actuator element. As previously noted, there is additionally provided in some embodiments of the invention a controller for controlling the drive arrangement to achieve a determined surface contour of the compliant surface.

In a further embodiment of the invention, there are provided a plurality of further compliant frame members, each having a respective first predetermined contour characteristic and arranged to communicate with the second side of the compliant surface, whereby an aspect of the respective first predetermined contour characteristic is imparted to the compliant surface. Additionally, there is provided a plurality of further actuator elements and a plurality of further linkage elements coupled at a respective first end thereof to a respectively associated one of the plurality of further compliant frame members, and at a second end thereof to a respectively associated one of the further actuator elements. Thus, displacement of the respectively associated one of the further actuator elements results in a corresponding variation in the contour of the compliant frame member in the vicinity of the respectively associated one of the plurality of further compliant frame members. In a further embodiment, there is provided a plurality of further drive coupling arrangements for coupling the drive arrangement to the respective associated one of a plurality of further actuator elements in accordance with a further predetermined drive characteristic. The predetermined drive characteristic is responsive to a predetermined extended surface contour on the first side of the compliance surface that extends over a plurality of the further compliant frame members.

In one embodiment of this aspect of the invention, the plurality of further compliant frame members are each integrally formed with a respectively associated one of the plurality of further actuator linkage elements. In a still further embodiment, the plurality of further actuator linkage elements are each integrally formed with a respectively associated one of the further actuator elements.

The present invention affords significant advantages over known arrangements for achieving optimization of airfoil control surfaces for various operating conditions. In addition, since there are no external joints or linkages, the present invention is particularly adapted for aircraft arrangements that are intended not to be visible by radar systems. Discrete control surfaces can be achieved with the present invention. As previously stated, lift:drag ratio can be tailored as desired, to achieve greater primary flight control. In addition, as stated, the present invention is not limited to achieving airfoil conditions in specific flight situations, as the invention can be configured to effect in-flight or preflight deicing.

BRIEF DESCRIPTION OF THE DRAWING

Comprehension of the invention is facilitated by reading the following detailed description, in conjunction with the annexed drawing, in which.

DETAILED DESCRIPTION

Figure 1:
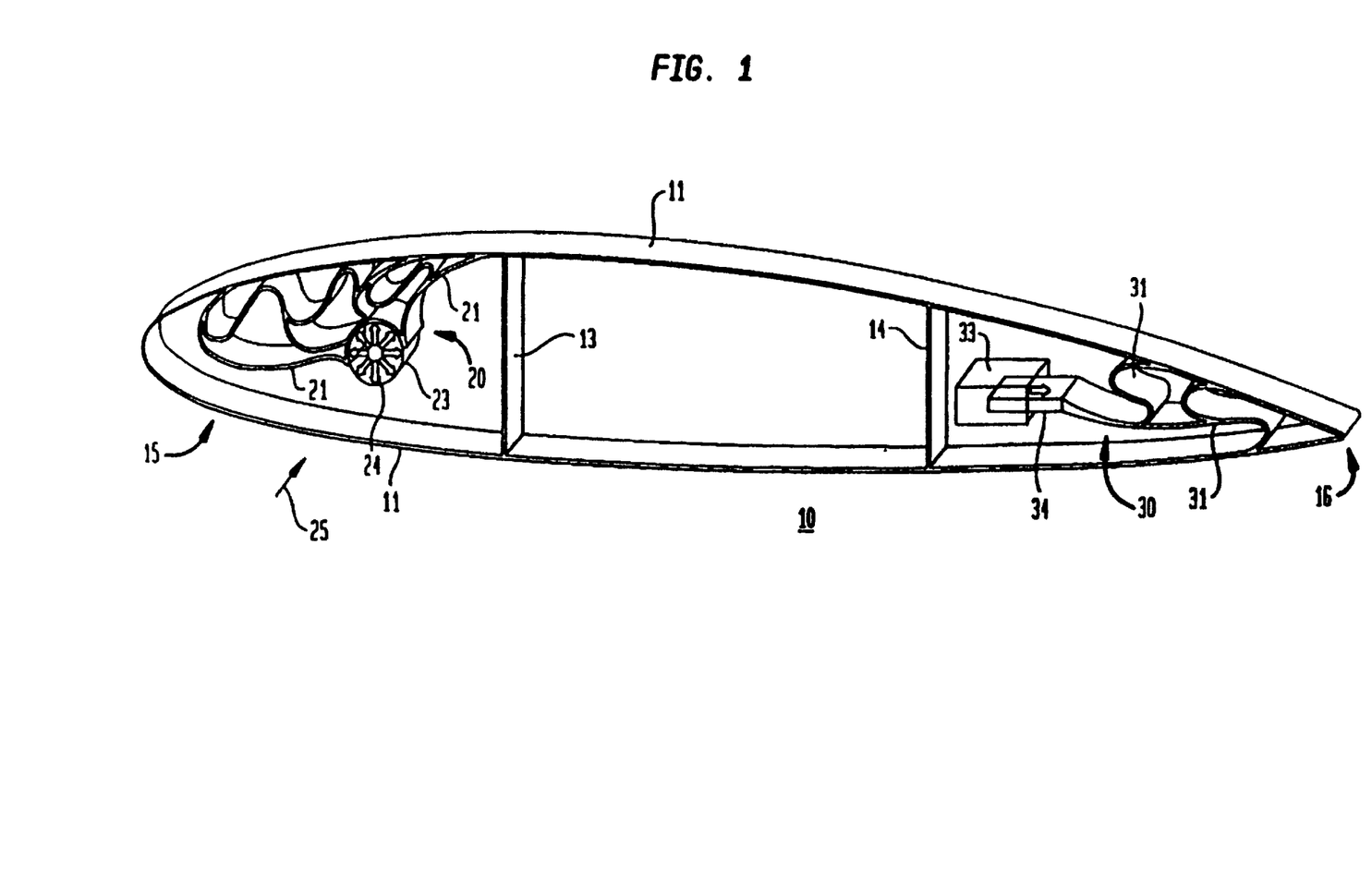
FIG. 1 is a schematic isometric representation of a specific illustrative airfoil embodiment of the invention having two deformation arrangements therein.

FIG. 1 is a schematic isometric representation of a specific illustrative embodiment of the invention in the form of an airfoil 10. As shown in this figure, airfoil 10 has a cross-sectional configuration that corresponds to the shape of an airplane wing. The airfoil is formed of a compliant frame 11 that is shown to be continuous and supported internally by support members 13 and 14 that, in this embodiment, have respective fixed lengths. In use in an aircraft (not shown), airfoil 10 would underlie a compliant surface, or skin (not shown) that would be deformed to achieve a predeterminable contour as will be described herein.

The airfoil is configured to have a leading edge that is generally designated 15 and a trailing edge that is generally designated 16. In this specific embodiment, in the vicinity of leading edge 15 and forward of support 13 there is provided a deformation arrangement 20 that is provided with a plurality of compliant linkage elements 21 that coupled at their respective first ends to compliant frame 11 and at respective second ends thereof to an actuator element 23 that is schematically represented in the figure. In this specific embodiment, the deformation arrangement is actuated by the application of a radial force, in the direction of arrows 24 within actuator element 23. Such radial forces can be applied in the practice of the invention by urging a conical wedge (not shown) into actuator element 23. The insertion of such a wedge, in the direction of arrow 25, would be translated into deformation of compliant frame 11, in the manner that will be described hereinbelow, and in a direction substantially orthogonal to the direction of arrow 25. Actuator element 23, in this embodiment, therefore corresponds to an expandable ring.

Between trailing edge 16 and support member 14 there is provided, in this specific embodiment, a further deformation arrangement 30 that is provided with a plurality of compliant linkage elements 31. As shown, compliant linkage elements 31 are coupled at respective first ends thereof to compliant frame 11, and at their second ends to an actuation mechanism 33 that is schematically illustrated in the drawing. Actuation mechanism 33 is provided with an armature 34 which, when actuated, is displaced in the direction of the arrow thereon. Thus, deformation arrangement 30 differs from deformation arrangement 20 in that the actuating force applied to operate deformation arrangement 20 is substantially orthogonal to the plane of compliant frame 11, whereas in deformation arrangement 30, the actuation force provided by armature 34 is applied substantially in the direction parallel to the plane of compliant frame 11.

Figure 2:
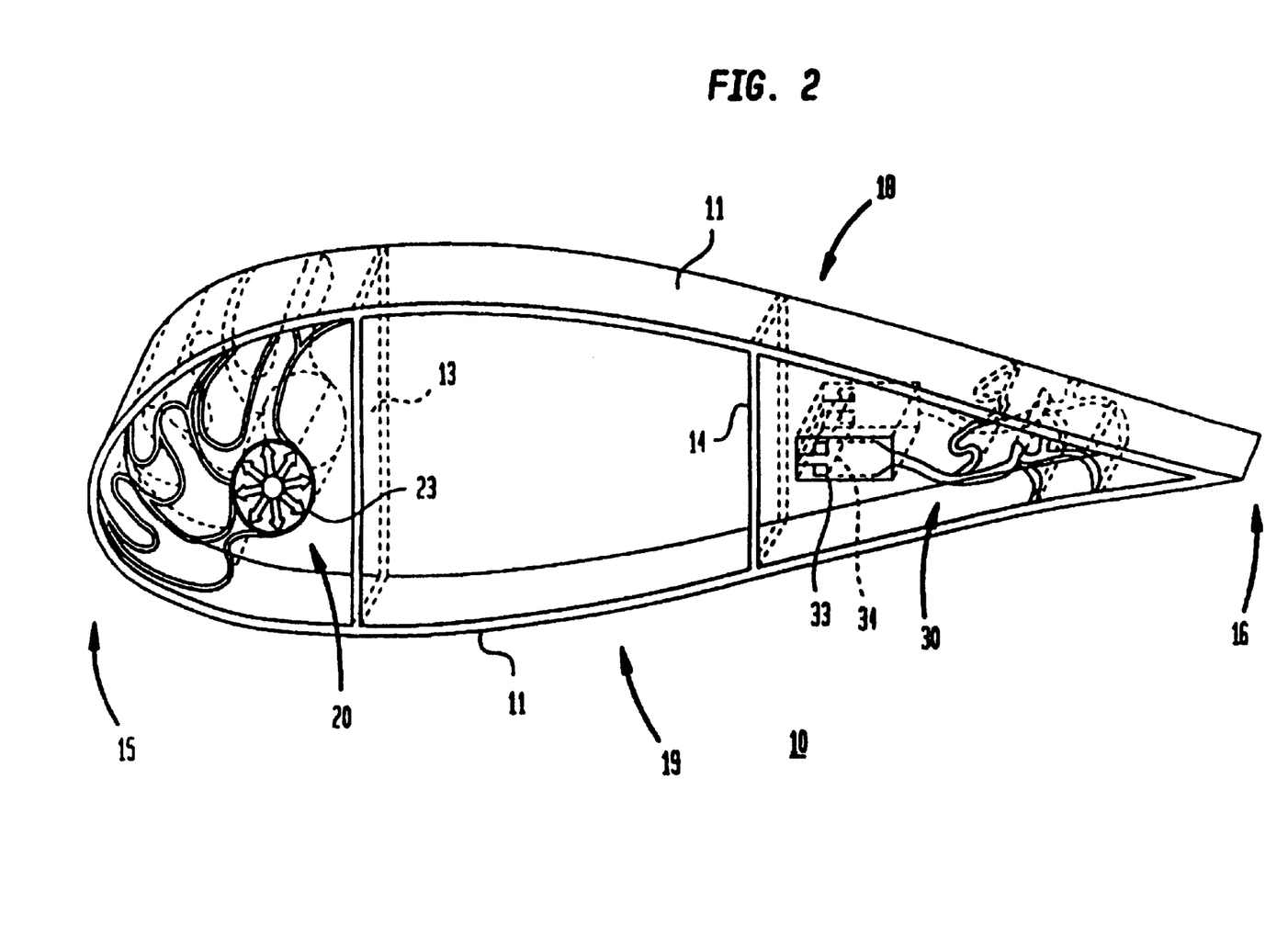
FIG. 2 is a schematic representation of the embodiment of FIG. 1 in a first state of deformation.

FIG. 2 is a schematic isometric representation of airfoil 10 described hereinabove. The elements of structure in this figure are designated identical to corresponding elements of structure discussed hereinabove with respect to FIG. 1.

As shown in FIG. 2, actuation element 23 of deformation arrangement 20 is in an unexpanded condition. Also, armature 34 of actuator mechanism 33 of deformation arrangement 30 is in a retracted state.

Figure 3:
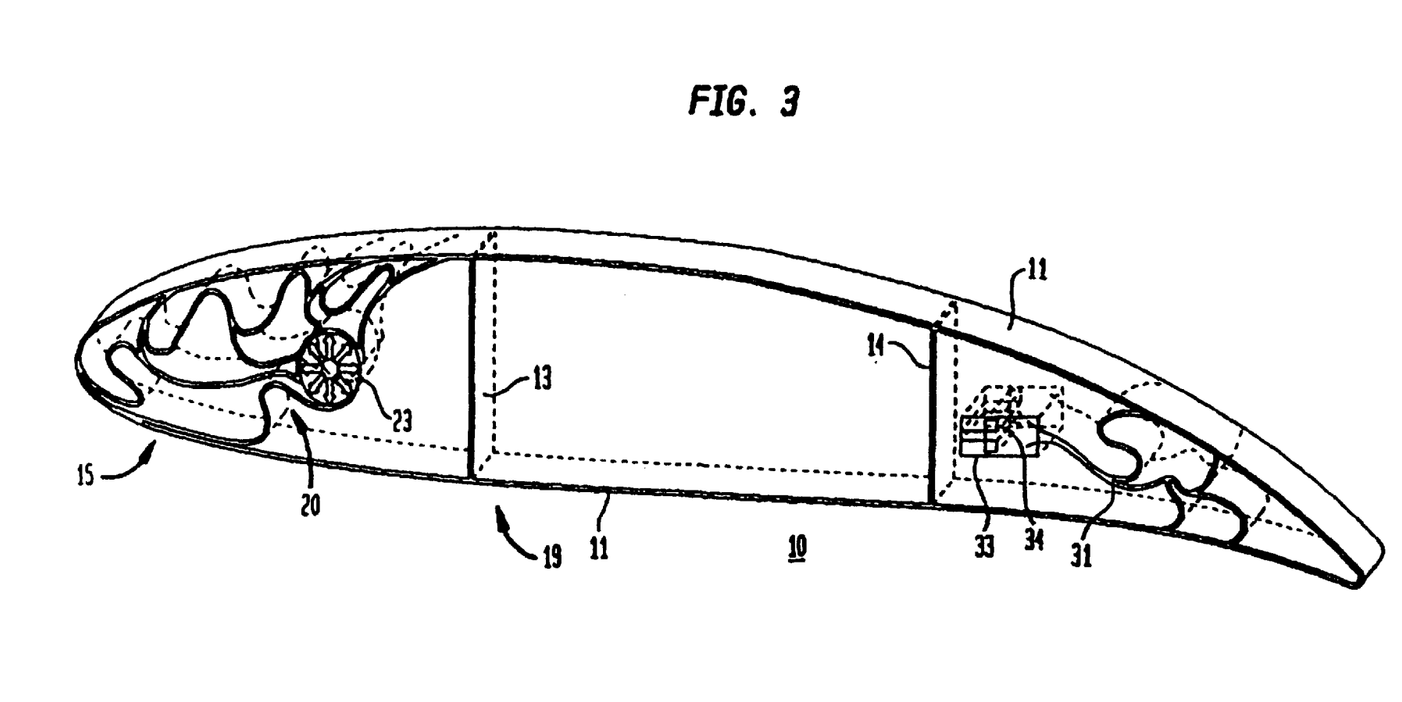
FIG. 3 is a schematic isometric representation of the embodiment of FIGS. 1 and 2 in a second state of deformation.

FIG. 3 is a schematic isometric representation of the embodiment of FIGS. 1 and 2 showing the effect on the contour of airfoil 10 when actuator 23 is expanded radially and when armature 34 is extended toward trailing edge 16. With the deformation arrangements in these respective conditions, FIG. 3 shows airfoil 10 to have a greater convexity on upper surface 18 than in FIG. 2. Additionally, bottom surface 19 is shown in FIG. 3 to have a greater concavity than in FIG. 2. More specifically, in FIG. 3, the portion of the airfoil forward of support 13 is shown to be urged downward, as is the portion of the airfoil reward of support 14.

Figure 4:
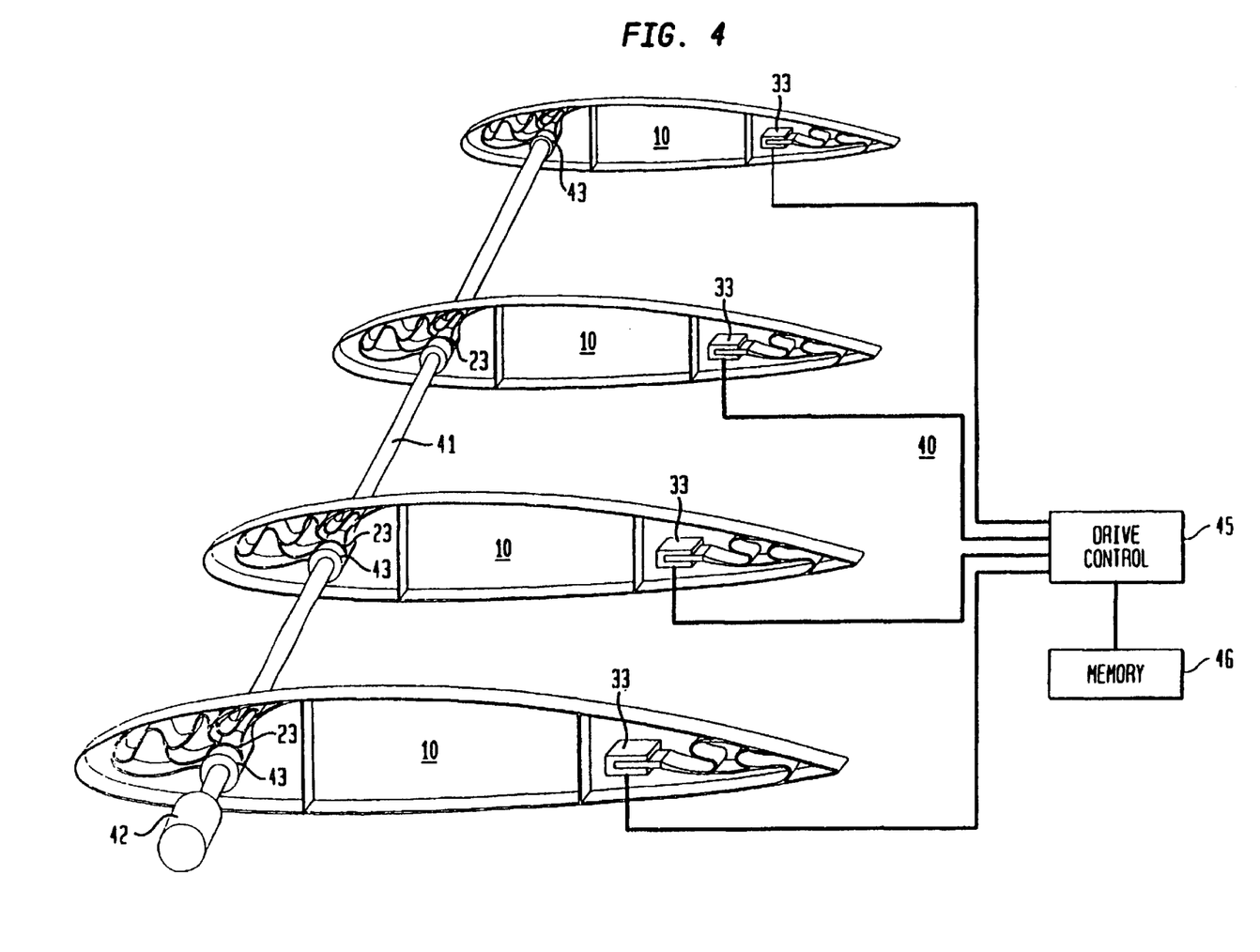
FIG. 4 is a schematic isometric representation of a plurality of structures in accordance with FIG. 1, the deformation arrangements being interconnected by a drive arrangement.

FIG. 4 is an isometric representation of a portion of an aircraft wing 40 showing a plurality of airfoils 10 arranged sequentially on a common shaft 41. In this highly simplified schematic representation, shaft 41 is rotatable in response to a drive actuator 42. Actuator 42 may be operated pneumatically, hydraulically, or electrically, and is shown to be coupled to each of the respective actuator elements 23 described hereinabove.

Each actuator element 23 has associated therewith a substantially conical wedge nut 43 that is threadedly engaged with drive shaft 41. In some embodiments of the invention, the threaded engagement between wedge nuts 43 and drive shaft 41 are not all at the same thread pitch. Thus, for example, a sequentially different drive characteristic may be employed along the length of the aircraft wing.

In other embodiments of the invention, each of the deformation elements is individually actuated, such as by actuation mechanism 33 associated with the deformation elements in the vicinity of the trailing edge of the wing. Each such actuation mechanism is controllable by a drive control 45 whereby a different drive actuation can be applied to each such actuation mechanism to effect an overall contour that varies along the length of the wing. Thus, for example, respective wing contours can be optimized for respective flight conditions, as previously described. In addition, a plurality of predetermined contours can be stored in a memory 46 which is shown to be coupled to drive control 45.

In some embodiments of the invention, drive control 45 can be applied to control the deformation arrangements in the leading portion of the wing. In embodiments such as the ones shown in FIG. 4, sensors (not shown) can be employed in combination with the wedge nuts and the actuator elements to provide a feedback signal that can be correlated with data stored in memory 46 to achieve the desired overall wing contour. In other embodiments, each of the forward deformation arrangements is individually driven and controlled, as are the trailing deformation arrangements. Thus, a fully computerized adjustable aircraft wing can be achieved.

In the practice of the invention, the outer skin can be made, for example, of an aluminum alloy, a magnesium alloy, or a polymeric or metal matrix composite material. Such materials achieve the intended objective which is to alter the cross-sectional geometry of the airfoil (camber, aspect to ratio, etc.) and to deflect the leading and trailing edges upon application of an actuation force. In the embodiment of FIG. 4, drive shaft 41 is coupled to rotary actuator 42 near the fuselage (not shown) of the aircraft (not shown). The shaft is supported on a bearing (not shown) at the distal end thereof. There are, as shown, at least as many wedge nuts 43 as there are airfoils. In some embodiments, however, each airfoil is provided with a pair of wedge nuts, one on each side, (not shown) the wedge nuts being in counter-threaded engagement with the drive shaft. Thus, the wedge nuts can be urged toward one another to increase the magnitude of the radial forces that are exerted by the actuation elements. Such increase in the diameter of the actuator elements exerts radial forces on the compliant linkage elements, which then undergo elastic deformation, thereby storing some strain energy and transferring the input energy to the outer skin (not shown) of the airfoil to which they are attached. This causes the skin, which has compliant characteristics, to stretch, or otherwise be deformed, thereby increasing the cross-sectional area of the airfoils. The skin does not necessarily undergo elastic deformation. Instead, as the actuator element expand transferring input energy to the compliant linkage elements, the outer skin will slide so as to conform to the shape of the compliant frame.

In the practice of the invention, the compliant deformation arrangement is configured to operate with a very high mechanical advantage to reduce deformation under external loading. Such a high mechanical advantage is achieved by designing the compliant deformation arrangement whereby the compliant linkage elements are attached to the compliant frame in a manner that is more or less perpendicular to the outer skin. Thus, the compliant linkage elements will be essentially in compression and therefore able to withstand high external loading. The compliant linkage elements however experienced bending forces when the mechanism is in transition from one desired profile to another. As previously noted, such bending forces may correspond to lateral beam deformation. In other embodiments, however, the compliant linkage elements are subjected to compression and tension loads exclusively (i.e., without lateral deformation).

Figure 5:
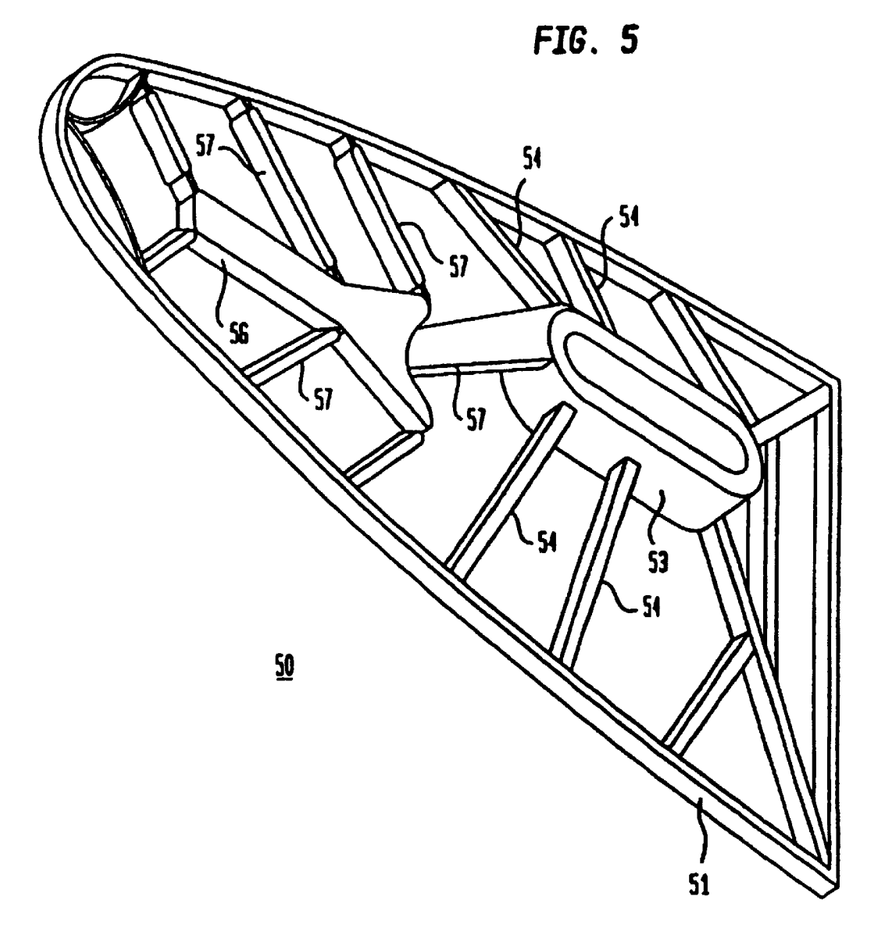
FIG. 5 is a schematic isometric representation of a further embodiment of the invention.

FIG. 5 is a simplified schematic isometric representation of a further embodiment of the invention. As shown, an airfoil 50 has a compliant frame 51 arranged to surround an actuation element 53 having a plurality of linkage elements 54 extending therefrom. The linkage elements are connected at respective first ends thereof to compliant frame 51, and at their respective second ends to actuator element 53. The actuator element is shown, in this embodiment, to be disposed out of the plane of the compliant frame and has an elongated configuration. In this specific embodiment, there is provided a second actuation element 56 that is coupled to actuation element 53 by an actuator linkage 57. Actuator element 56 is shown in this embodiment to be in the plane of compliant frame 51, and has a plurality of linkage elements 57 coupled thereto and to compliant frame 51.

As actuator element 53 is displaced with respect to compliant frame 51, a corresponding displacement of the linkage elements causes a deformation of compliant frame 51. The actuator element can be displaced in a number of directions to achieve a desired or predetermined deformation of the compliant frame. For example, the actuator element can be urged evenly into the plane of the compliant frame, or at an angle into the plane of the compliant frame, or the actuator element can be rotated about any of several axes to achieve a desired contour of the compliant frame. Also, as actuator element 53 is displaced, a corresponding displacement of actuator element 56 is effected by operation of coupling element 57.

In one embodiment of this aspect of the invention, the entire structure shown in FIG. 5 is integrally formed. In still further embodiments, a pair of airfoils 50 can be stacked back-to-back at each airfoil location, whereby their respective actuation elements can be compressed toward one another to effect the desired deformation of the compliant frame.

Although the invention has been described in terms of specific embodiments and applications, persons skilled in the art can, in light of this teaching, generate additional embodiments without exceeding the scope or departing from the spirit of the claimed invention. Accordingly, it is to be understood that the drawing and description in this disclosure are proffered to facilitate comprehension of the invention, and should not be construed to limit the scope thereof.

What is claimed is:

1. An arrangement for producing a variable contour of a compliant surface, the arrangement comprising:

a compliant frame member having a variable contour arranged to communicate with the compliant surface, the variable contour of the compliant surface being responsive to the variable contour of said compliant frame member;

an actuator element arranged in predetermined first relation with respect to said compliant frame member;

at least one linkage element coupled at a first end thereof to said compliant frame member and at a second end thereof to said actuator element, whereby displacement of said actuator element results in a corresponding displacement of the variable contour of said compliant frame member, said linkage element having a predetermined resilience characteristic having a directional aspect with a resilient compression characteristic.

2. The arrangement of claim 1, wherein said compliant frame member, said actuator element, and said linkage element are integrally formed.

3. The arrangement of claim 1, wherein the displacement of said actuator element is transmitted via said linkage element to produce the corresponding displacement of the variable contour of said compliant frame member in a direction substantially orthogonal to the displacement of said actuator.

4. The arrangement of claim 3, wherein there is further provided a plurality of further linkage elements, each coupled at a respective first end thereof to said compliant frame member at a predetermined compliant frame location, and at a second end thereof to said actuator element, whereby displacement of said actuator element results in a corresponding displacement of the variable contour of said compliant frame member.

5. The arrangement of claim 4, wherein said actuator element has a predetermined configuration and said plurality of further linkage elements are each coupled at said respective second ends thereof at a predetermined actuator location of said actuator, element.

6. The arrangement of claims 5, wherein said actuator element is angularly displaceable with respect to said compliant frame member, whereby angular displacement of said actuator element with respect to said compliant frame member results in a predetermined corresponding displacement of the variable contour of said compliant frame member.

7. The arrangement of claim 5, wherein there are further provided:

a second actuator element coupled to said actuator element; and an additional linkage element coupled at a first end thereof to said compliant frame member at a predetermined compliant frame location, and at a second end thereof to said second actuator element, whereby displacement of said second actuator element, in response to displacement of said actuator element, results in a displacement of the variable contour of said compliant frame member.

8. The arrangement of claim 1, wherein there is further provided a plurality of further linkage elements, each coupled at a respective first end thereof to said compliant frame member at a predetermined compliant frame location, and at a second end thereof to said actuator element, said linkage element and said further linkage elements having a determined compliance characteristic that enables transmission there along of a load, whereby rotatory displacement of said actuator element results in a corresponding displacement of the variable contour of said compliant frame member.

9. The arrangement of claim 1, wherein there is further provided a plurality of further linkage elements, each coupled at a respective first end thereof to said compliant frame member at a predetermined location thereof, and at a second end thereof to said actuator element, said linkage element and said further linkage elements having a determined compliance characteristic that enables transmission there along of load, whereby radial displacement of said actuator element results in a corresponding displacement of the variable contour of said compliant frame member.

10. The arrangement of claim 1, wherein said compliant surface is a surface of an airfoil.

11. The arrangement of claim 1, wherein said compliant surface is arranged to effect deicing of a surface of an airfoil.

12. The arrangement of claim 1, wherein said compliant surface is a surface of a rotor blade of a rotary wing aircraft.

13. The arrangement of claim 1, wherein said compliant surface is a surface of a hydrofoil.

14. The arrangement of claim 1, wherein said compliant surface is arranged at an air inlet of an engine.

15. An arrangement for producing a variable contour of a compliant surface, the arrangement comprising:

a compliant frame member having a variable contour arranged to communicate with the compliant surface, the variable contour of the compliant surface being responsive to the variable contour of said compliant frame member;

an actuator element arranged in predetermined first relation with respect to said compliant frame member;

at least one linkage element coupled at a first end thereof to said compliant frame member and at a second end thereof to said actuator element, whereby displacement of said actuator element results in a corresponding displacement of the variable contour of said compliant frame member, said linkage element having a predetermined resilience characteristic having a directional aspect with a resilient lateral deflection characteristic.

* * * * *